Figure 1:
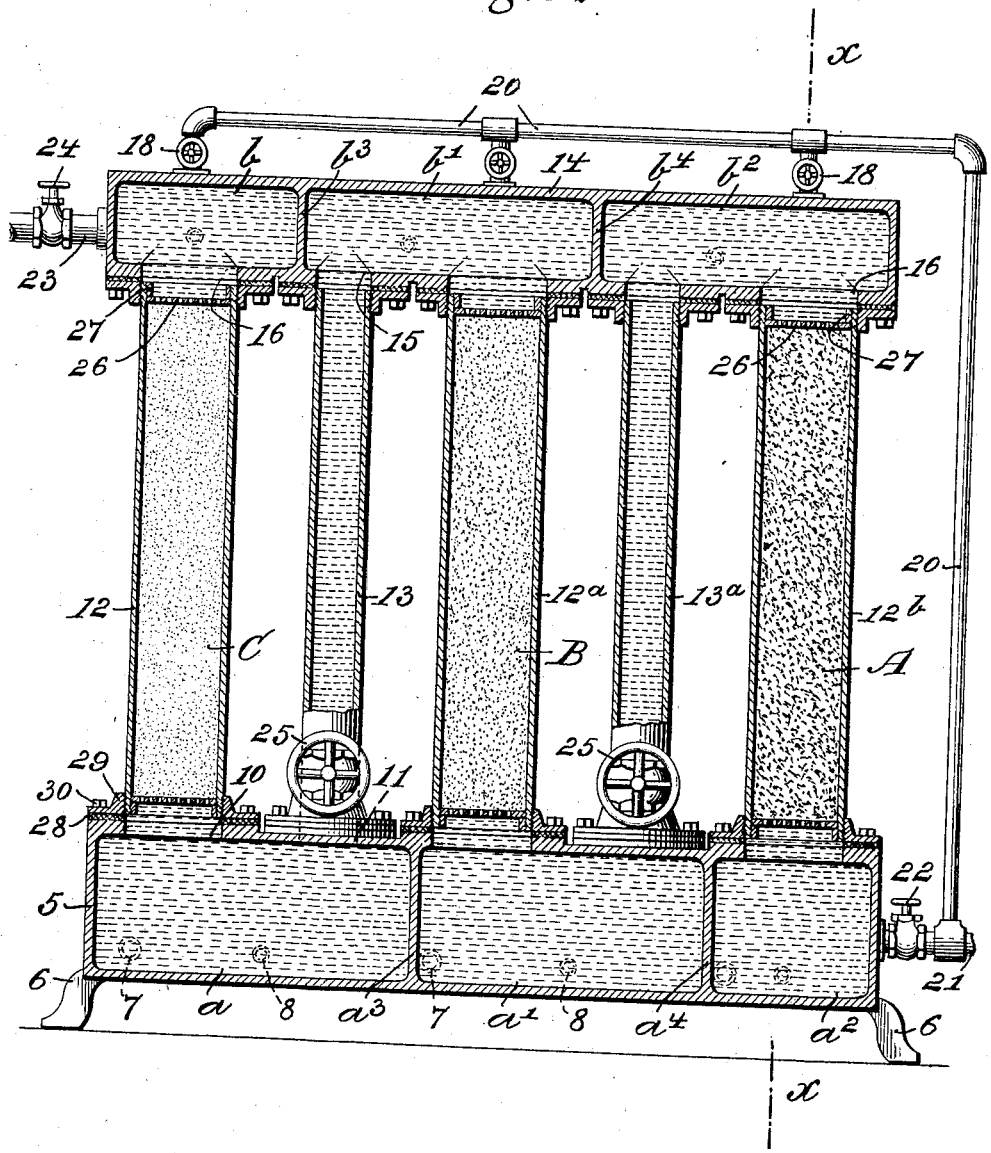

No. 838,052. PATENTED DEC. 11, 1906.
D. M. PFAUTZ.
VERTICAL FILTERING APPARATUS.
APPLICATION FILED AUG. 8, 1906.

2 SHEETS—SHEET 1.

WITNESSES:
INVENTOR
ATTORNEY.

No. 838,052. PATENTED DEC. 11, 1906.
D. M. PFAUTZ.
VERTICAL FILTERING APPARATUS.
APPLICATION FILED AUG. 8, 1906.
2 SHEETS—SHEET 2.
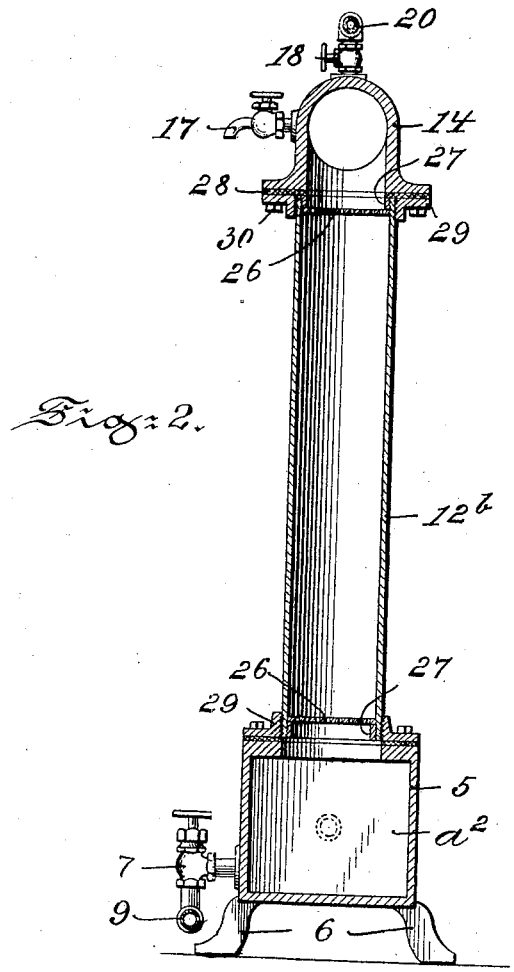
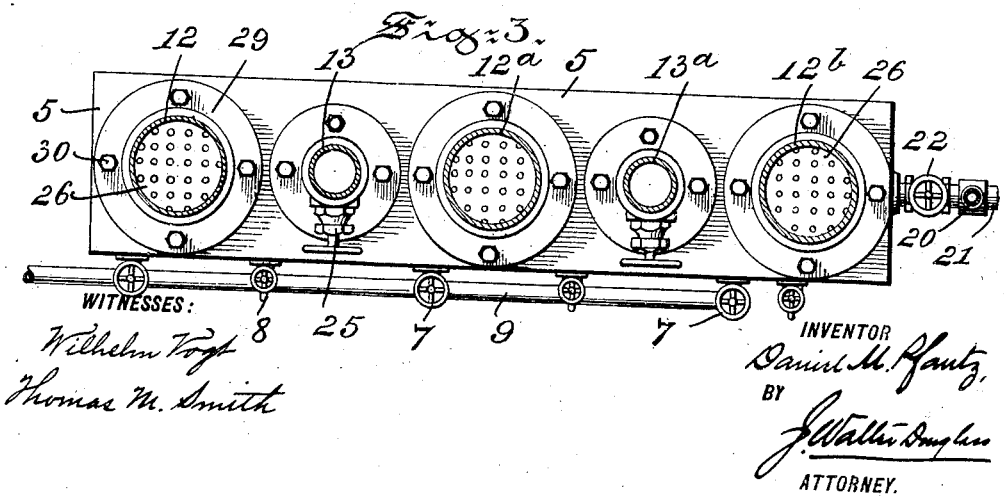
WITNESSES:
Wilhelm Vogt
Thomas M. Smith
INVENTOR
Daniel M. Pfautz,
BY
J. Walter Douglas
ATTORNEY.

UNITED STATES PATENT OFFICE.

DANIEL M. PFAUTZ, OF GERMANTOWN, PENNSYLVANIA, ASSIGNOR TO AMERICAN WATER PURIFYING COMPANY, OF CAMDEN, NEW JERSEY, A CORPORATION OF NEW JERSEY.

VERTICAL FILTERING APPARATUS.

No. 838,052.     Specification of Letters Patent.     Patented Dec. 11, 1906.

Application filed August 8, 1906. Serial No. 329,659.

*To all whom it may concern:*

Be it known that I, DANIEL M. PFAUTZ, a citizen of the United States, residing at Germantown, in the county of Philadelphia and State of Pennsylvania, have invented certain new and useful Improvements in Vertical Filtering Apparatus, of which the following is a specification.

My invention has relation to a vertical filtering apparatus especially adapted for filtration of water under pressure, and in such connection it relates to the constructive arrangement of the apparatus for use for efficient household filtration of water, as well as the filtration of water of municipalities.

The principal objects of my invention are, first, to provide a filtering apparatus with a series of receptacles for filtering media and to so connect the same with a base and a head casting as to permit of the ready withdrawal of one or more of the filtering-receptacles from the castings for thorough cleansing or replacement of filtering media without necessitating the dismantling of the apparatus; second, to so arrange the filtering apparatus that an increase or decrease in the quantity of filtering media may be readily accomplished by replacing the filter-receptacles thereof by such of greater or less length; third, to provide the filtering apparatus with tubes for the reception of filtering media and to provide the same with threaded ends to permit of the ready connection and disconnection of the tubes with threaded rings adapted to removably connect the tubes with the castings; fourth, to provide the apparatus with auxiliary tubes interposed between the filter-tubes to permit of the flow of the water to be filtered in an upward direction through the filter-tubes, and, fifth, to so arrange the lower or base castings of the filtering apparatus as to permit the same to readily support the filter and water tubes and by the same the head-casting and form in conjunction therewith a unitary structure which can partially or completely be dismantled and reassembled by unskilled labor.

The nature and scope of my invention will be more fully understood from the following description, taken in connection with the accompanying drawings, forming part thereof, in which—

Figure 1 is a view illustrating, partly in longitudinal central section and partly in elevation, a filtering apparatus embodying main features of my said invention. Fig. 2 is a cross-sectional view of the same on the line $x$ $x$ of Fig. 1, and Fig. 3 is a horizontal sectional view of the said filtering apparatus.

Referring to the drawings, 5 represents an oblong casting of preferably rectangular outline, which is supported by legs 6 and is divided into sections or compartments $a$, $a'$, and $a^2$ by partition-walls $a^3$ and $a^4$. The casting 5, by means of a series of receptacles for filtering media—in the present instance three receptacles 12, $12^a$, and $12^b$, preferably consisting of cylindrical bodies or tubes and two water-circulating tubes 13 and $13^a$—supports a second or head casting 14, likewise divided into sections or compartments by partition-walls $b^3$ and $b^4$ for a purpose to be presently more fully described. The head-casting 14 is rounded at its upper end and is of a diameter not exceeding the diameter of one of the filter-tubes, so as to render the same as light as possible, and thus to permit the base 5 to support the tubes 12, $12^a$, and $12^b$ and 13 and $13^a$, as well as the head-casting 14, unaided in a vertical or operative position. The filter-tubes 12, $12^a$, and $12^b$ and water-circulating tubes 13 and $13^a$ communicate with the interior of the base 5 and head 14 by openings 10 and 11 and 16 and 15, respectively arranged in the same. The base 5, head 14, and the series of tubes 12, $12^a$, $12^b$ 13, and $13^a$ form the filtering apparatus proper, and their arrangement is such as to permit of the ready assembling and dismantling of the apparatus by unskilled labor, of the removal of one or more of the filter-tubes 12, $12^a$, and $12^b$ without the dismantling of the apparatus, and of the increase or decrease of the quantity of filtering media contained in the filter-tubes by the mere insertion of filter-tubes of greater or less length than those in use, in which instance, however, the head 14 of the apparatus must first be removed from the filter and circulating tubes.

In order to permit of the removal of one or more of the filter-tubes without taking the apparatus apart and also to permit of the ready connection and disconnection of the same from the base 5 and head 14, each of the tubes 12, 12$^a$, and 12$^b$ is threaded at its respective ends to removably receive a threaded and flanged ring 29. The rings 29, in conjunction with gaskets or washers 28, hold the filter-tubes out of engagement with the base 5 and head 14 and form the connecting-link between the same. If, therefore, the ring 29 and washers 28 of one or two of the filter-tubes are disengaged from the base 5 and head 14 by the removal of the respective bolts 30 and by the slight forward movement of the washers and rings thereof toward the central portion of the respective tubes, the rings and washers will be loosened from the base 5 and head 14, and the filter-tubes so disconnected can now freely sidewise be withdrawn from the same. The filtering-tubes 12, 12$^a$, and 12$^b$, containing in a direction from right to left in Fig. 1 silica quartz A, blast-furnace scoria B, and granular pumice-stone C and requiring replacement from time to time, can be successively removed and after refilling again connected with the base 5 and head 14 without taking the apparatus apart. If the quantity of filtering media contained in the filter-tubes is not sufficient to remove all the impurities from the water passing therethrough, the same can readily be replaced by tubes of greater length, and thus of greater receiving capacity. As the tubes require only a thread at each end to be readily connected with the rings 29, it follows that the removal and replacement of the longer tubes can quickly be accomplished by unskilled labor. In this instance it is also required to replace the water-circulating tubes 13 and 13$^a$ by longer tubes, which by being similarly connected by rings 29 and washers 28 with the base 5 and head 14, can likewise be quickly removed and connected with the same.

In order to hold the filtering media in proper position in the filter-tubes 12, 12$^a$, and 12$^b$, the same are closed at each end by a perforated plate 26, which is held in position in the filter-tubes, preferably by a ring 27, as shown in Figs. 1 and 2. The water to be filtered enters the compartment $a^2$ of the base 5 by a conduit 21, from which the same is forced to flow in an upward direction through the filter-tube 12$^b$. From this tube 12$^b$ the water enters the compartment $b^2$ of the head 14, and if the same is in a sufficiently purified state may be withdrawn therefrom by a spigot 17, for which purpose a valve 25, arranged in the adjacent water-tube 13$^a$, is closed. The tube 13$^a$ serves to conduct the water, if not sufficiently purified, into the compartment $a'$ of the base 5, from which the same, through the filter-tube 12$^a$, is conducted into the compartment $b'$ of the head 14 and, if necessary, from thence is conducted through the water-tube 13, compartment $a$ of the base 5, and the filter-tube 12 into the compartment $b$ of the head 14, from which it is withdrawn by a tube 23.

If it becomes necessary to remove the impurities from the filtering media in the filter-tubes 12, 12$^a$, and 12$^b$, this can be accomplished without removing the filter-tubes. In this instance the valve 22 in the conduit 21 is closed and valves 18 of branch pipes connecting a pipe 20 with the respective compartments $b$, $b'$, and $b^2$ of the head 14 are opened. The water from the conduit 21 will now flow into the head 14 through the pipe 20 and enter the compartments of the same, from which the water will now pass in a downward direction through the filter-tubes 12, 12$^a$, and 12$^b$ into the compartments $a$, $a'$, and $a^2$ of the base 5. The water, aided by gravity, will dislodge all impurities from the filtering media and will conduct the same into the compartments of the base 5, from which the water and impurities are discharged by branch pipes and a pipe 9 into a drain-pipe or culvert. (Not shown.) In this instance, however, it is necessary to close the valves 25 of the water-pipes 13 and 13$^a$ and to open the valves 7 of the branch pipes of the pipe 9.

The progress made in the cleansing of the filtering media can readily be determined by the opening of the spigots 8, arranged in the base 5, and the spigots 17, arranged in the head 14, of the filtering apparatus, as will be readily understood in connection with Fig. 1 of the drawings. Owing to the flow of water in an upward direction through the filtering-tubes 12, 12$^a$, and 12$^b$, the compartments $a$, $a'$, and $a^2$ of the base 5 serve as receiving-receptacles for coarser impurities carried along with the water, which are precipitated therein, and thus prevented from entering the filtering media in the respective filter-tubes. Moreover, a portion of the impurities removed from the water by the filtering media will by the force of gravity descend into the compartments $a$, $a'$, and $a^2$, from which the same may be removed from time to time by the opening of the valve 7 of the drain-pipe 9.

It will be observed as the series filtrations of water are arranged in the apparatus as described that cleansing of the apparatus can be efficiently accomplished either independently of each other or successively without taking the apparatus apart. Moreover, the replenishing of filtering media in the tubes can with facility be accomplished by the manner in which the apparatus is arranged by removing the rings 29, gaskets 28, and bolts 30, as hereinbefore fully described, whereby the filtering-tubes can be removed.

Having thus described the nature and ob- jects of my invention, what I claim as new, and desire to secure by Letters Patent, is—

1. In a filtering apparatus, a casting forming a base, a tube containing filtering media, a second casting forming a head, and means removably connected with said tube and adapted to removably connect the same with said base and head, and said base adapted to support said tube and head in an operative position.

2. In a filtering apparatus, a casting forming a base, a second casting forming a head, a series of tubes containing filtering media, means removably secured to each of said tubes adapted to connect the same with said base and head, said means arranged when disengaged from said base and head and moved on said tubes to permit of withdrawal from said base and head.

3. In a filtering apparatus, a casting forming a base, a second casting forming a head, a series of tubes containing filtering media, and a series of tubes forming conduits for water to and from said base and head and each having threaded end portions, a threaded and flanged ring adjustably arranged at each end of said tubes, said rings adapted to respectively connect said filter and water tubes with said base to support the same thereon, to connect the tubes with said head and to serve as a support therefor.

4. In a filtering apparatus, a casting forming a base, a second casting forming a head, a series of tubes containing filtering media, a series of tubes forming conduits for water to and from said base and head, and said base and head forming conduits for water to and from said filter and water tubes, a flanged ring adjustably arranged at each end of said filter and water tubes and adapted to removably connect the same with said base and head, said rings adapted, when turned on said tubes, to increase or decrease the length of the same to permit of sidewise withdrawal or reinsertion between said base and head and a reconnection with the same.

5. In a filtering apparatus, a series of filter-receptacles, each consisting of a tube containing filtering media and having threaded portions at the respective ends, perforated means for closing each of the ends of the tubes, hollow castings forming a base and head and a conduit for water toward and from said tubes, and rings for removably connecting the filter-tubes with said castings, and tubes and said castings when connected adapted to permit of the flow of water therethrough.

6. In a filtering apparatus, a series of filter-receptacles, each consisting of a tube adapted to contain filtering media and having threaded portions at the respective ends, a perforated disk for closing each of the ends of said filter-tubes, a second series of tubes having threaded portions at their respective ends, two hollow castings forming a base and head and conduits for water to and from both series of tubes and threaded rings for removably connecting the series of tubes with said castings and supporting the tubes between the same.

In testimony whereof I have hereunto set my signature in the presence of two subscribing witnesses.

DANIEL M. PFAUTZ.

Witnesses:
J. WALTER DOUGLASS,
THOMAS M. SMITH.